(12) United States Patent
Lee et al.

(10) Patent No.: US 11,300,843 B2
(45) Date of Patent: Apr. 12, 2022

(54) DISPLAY DEVICE

(71) Applicant: Samsung Display Co., Ltd., Yongin-Si (KR)

(72) Inventors: Yong Hee Lee, Suwon-si (KR); Seung Min Lee, Seoul (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/066,585

(22) Filed: Oct. 9, 2020

(65) Prior Publication Data

US 2021/0325749 A1 Oct. 21, 2021

(30) Foreign Application Priority Data

Apr. 21, 2020 (KR) ........................ 10-2020-0047918

(51) Int. Cl.
*G02F 1/1339* (2006.01)
*G02F 1/1362* (2006.01)

(52) U.S. Cl.
CPC ...... *G02F 1/136286* (2013.01); *G02F 1/1339* (2013.01); *G02F 1/136222* (2021.01)

(58) Field of Classification Search
None
See application file for complete search history.

(56) References Cited

U.S. PATENT DOCUMENTS

2021/0263382 A1* 8/2021 Lee .................. G02F 1/133512

FOREIGN PATENT DOCUMENTS

| KR | 10-2015-0039002 A | 4/2015 |
| KR | 10-1675372 B1 | 11/2016 |
| KR | 10-2017-0082696 A | 7/2017 |
| KR | 10-2018-0057760 A | 5/2018 |
| KR | 10-2019-0047164 A | 5/2019 |

* cited by examiner

*Primary Examiner* — James A Dudek
(74) *Attorney, Agent, or Firm* — Innovation Counsel LLP (57) ABSTRACT

An embodiment provides a display device including: a first substrate; a gate line disposed on the first substrate and extending in a first direction; a storage electrode line extending in the first direction on the same layer as the gate line and including a protrusion partially protruding in a second direction perpendicular to the first direction; a data line insulated from the gate line and the storage electrode line and extending in the second direction; a drain electrode disposed on the same layer as the data line and including an extension portion overlapping the protrusion; a pixel electrode including a connecting portion electrically connected to the extension portion of the drain electrode; and a first spacer disposed on the pixel electrode and partially overlapping the protrusion of the storage electrode line, wherein the first spacer covers an edge of the connecting portion of the pixel electrode in the first direction.

20 Claims, 9 Drawing Sheets

DISPLAY DEVICE

CROSS-REFERENCE TO RELATED APPLICATION

This application claims priority to and the benefit of Korean Patent Application No. 10-2020-0047918 filed in the Korean Intellectual Property Office on Apr. 21, 2020, the entire contents of which are incorporated herein by reference.

BACKGROUND

1. Field

The present disclosure relates to a display device, and more particularly, to a liquid crystal display.

2. Description of the Related Art

Among display devices, a liquid crystal display is one of widely used flat panel displays and applies voltages to electrodes (pixel electrodes and a common electrode) disposed on substrates facing each other to control arrangement of liquid crystals of a liquid crystal layer interposed therebetween, thereby controlling an amount of transmitted light.

Meanwhile, recently, most liquid crystal displays have included a touch sensing function capable of interacting with a user in addition to a display function and a touch sensor may be embedded in the liquid crystal display or attached to a display panel of the liquid crystal display. In the liquid crystal display having the touch sensing function, when a user's finger or touch pen is touched to the display panel, pressure or the like may be applied to the display panel.

When pressure from the outside is applied to the display panel for various reasons as described above, arrangement of liquid crystal molecules is disturbed and, even if the pressure is eliminated, since the liquid crystal molecules are not restored to their original state to affect arrangement of adjacent liquid crystal molecules, a phenomenon in which luminance unevenly appears, that is, a bruising phenomenon, may occur which may affect display quality.

The above information disclosed in this Background section is only for enhancement of understanding of the background of the described technology, and therefore it may contain information that does not form the prior art that is already known in this country to a person of ordinary skill in the art.

SUMMARY

Embodiments are to provide a display device in which a bruising phenomenon is ameliorated.

An embodiment provides a display device including: a first substrate; a gate line disposed on the first substrate and extending in a first direction; a storage electrode line extending in the first direction on the same layer as the gate line and including a protrusion partially protruding in a second direction perpendicular to the first direction; a data line insulated from the gate line and the storage electrode line and extending in the second direction; a drain electrode disposed on the same layer as the data line and including an extension portion overlapping the protrusion; a pixel electrode including a connecting portion electrically connected to the extension portion of the drain electrode; and a first spacer disposed on the pixel electrode and partially overlapping the protrusion of the storage electrode line, wherein the first spacer covers an edge of the connecting portion of the pixel electrode in the first direction.

The first spacer may include a first overlapping portion overlapping an opening through which the connecting portion of the pixel electrode and the extension of the drain electrode are connected and a second overlapping portion overlapping at least a portion of the drain electrode and the gate line.

The first spacer may have a T-shape in a plan view.

The edge of the connecting portion of the pixel electrode may be covered by the first overlapping portion.

The display device may further include a color filter disposed between the drain electrode and the pixel electrode, and an insulating film disposed on the color filter.

The color filter and the insulating film may include the opening.

The pixel electrode may further include a cross-shaped stem portion including a horizontal stem portion extending in the first direction and a vertical stem portion extending in the second direction, a fine branch portion extending in a diagonal direction from the cross-shaped stem portion, and a horizontal bar portion extending from the connecting portion.

A width of the connecting portion may be 10 µm or more.

A distance from one end of the vertical stem portion to the connecting portion may be 7 µm or more.

The connecting portion and the fine branch portion connected to the connecting portion may include an opening having a rhombus shape.

Another embodiment provides a display device including a plurality of pixels displaying different colors, wherein the plurality of pixels may include: a gate line disposed on a first substrate and extending in a first direction; a storage electrode line extending in the first direction on the same layer as the gate line and including a protrusion partially protruding in a second direction perpendicular to the first direction; a data line insulated from the gate line and the storage electrode line and extending in the second direction; a drain electrode disposed on the same layer as the data line and including an extension portion overlapping the protrusion; a pixel electrode including a connecting portion electrically connected to the extension portion of the drain electrode; and a first spacer disposed on the pixel electrode and partially overlapping the protrusion of the storage electrode line, and wherein, in at least one of the plurality of pixels, the first spacer covers an edge of the connecting portion of the pixel electrode in the first direction.

The plurality of pixels may include a first pixel displaying red, a second pixel displaying green, and a third pixel displaying blue.

The third pixel may include a second spacer having a smaller area than that of the first spacer.

The first spacer and the second spacer may overlap an opening through which the connecting portion of the pixel electrode and the extension of the drain electrode are connected.

The first spacer may include a first overlapping portion overlapping the opening connecting the connecting portion of the pixel electrode and the extension of the drain electrode, and a second overlapping portion overlapping at least a portion of the drain electrode and the gate line.

The first spacer may have a T-shape.

The second spacer may have a square shape.

The first pixel may include a first color filter, the second pixel may include a second color filter, and the third pixel may include a third color filter, and a thickness of the third color filter may be greater than those of the first color filter and the second color filter.

The pixel electrode may further include a cross-shaped stem portion including a horizontal stem portion extending in the first direction and a vertical stem portion extending in the second direction, a fine branch portion extending in a diagonal direction from the cross-shaped stem portion, and a horizontal bar portion extending from the connecting portion.

An angle between an edge of the connecting portion and an edge of the horizontal bar portion adjacent to the edge of the connecting portion may be 45°.

According to the embodiments, by positioning a connecting portion of a pixel electrode within a side edge of a first spacer, it is possible to maximize liquid crystal control power to prevent defects such as a bruising phenomenon.

In addition, according to the embodiments, a display device having improved display quality and reliability may be provided by arranging different spacers for each pixel area.

DETAILED DESCRIPTION

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, areas, regions, etc., are exaggerated for clarity. In the drawings, for ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means disposed on or below the object portion, and does not necessarily mean disposed on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-section" or "on a cross-section" means viewing a cross-section formed by vertically cutting a target portion from the side.

Throughout the specification, "connected" does not mean only when two or more elements are directly connected, but when two or more elements are indirectly connected through other elements, and when they are physically connected or electrically connected, and further, it may be referred to by different names depending on a position or function, and may also be referred to as a case in which respective parts that are substantially integrated are linked to each other.

Hereinafter, a display device according to an embodiment will be described in detail with reference to the drawings.

Figure 1:
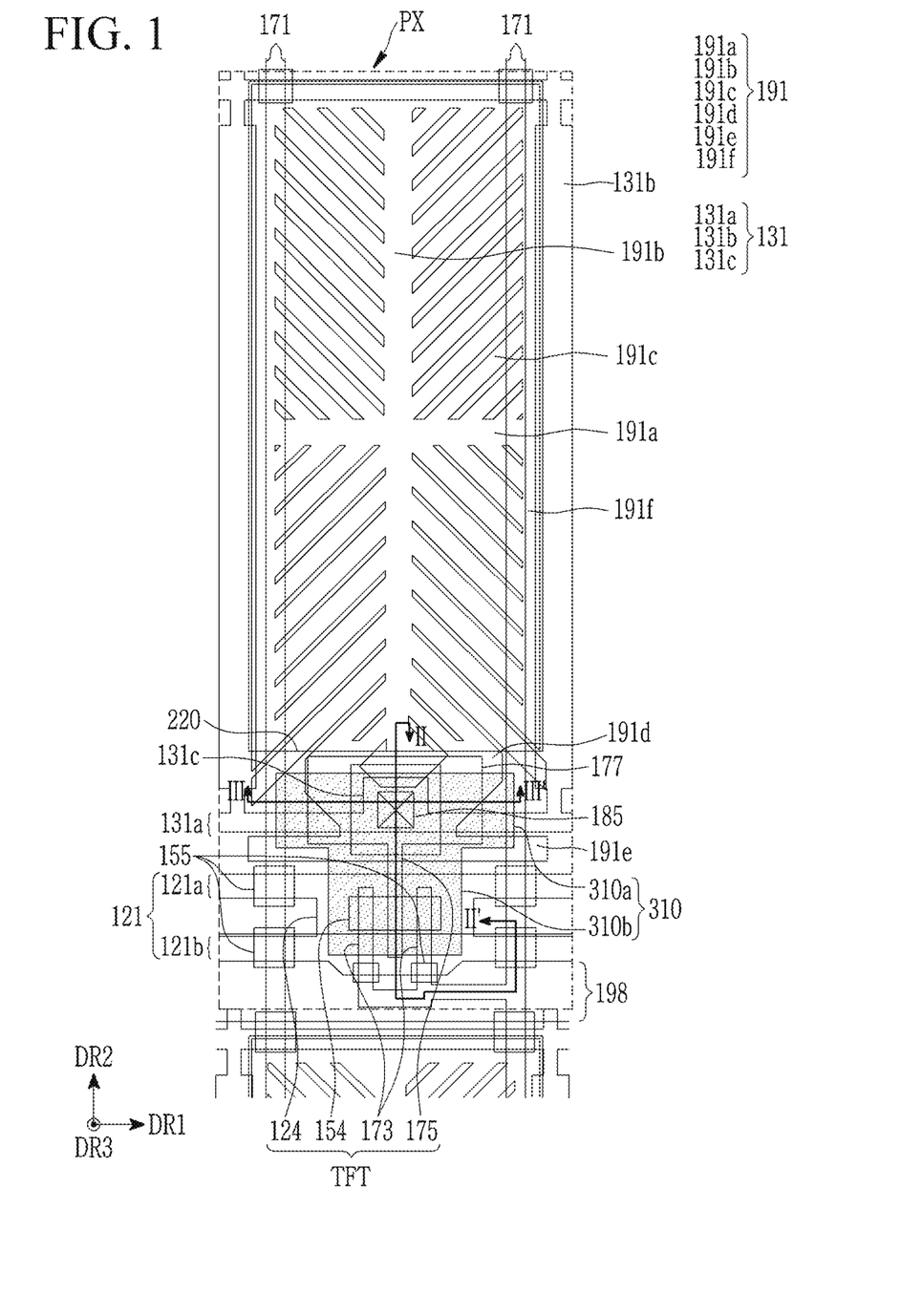
FIG. 1 illustrates a layout view of one pixel of a display device according to an embodiment.
Figure 2:
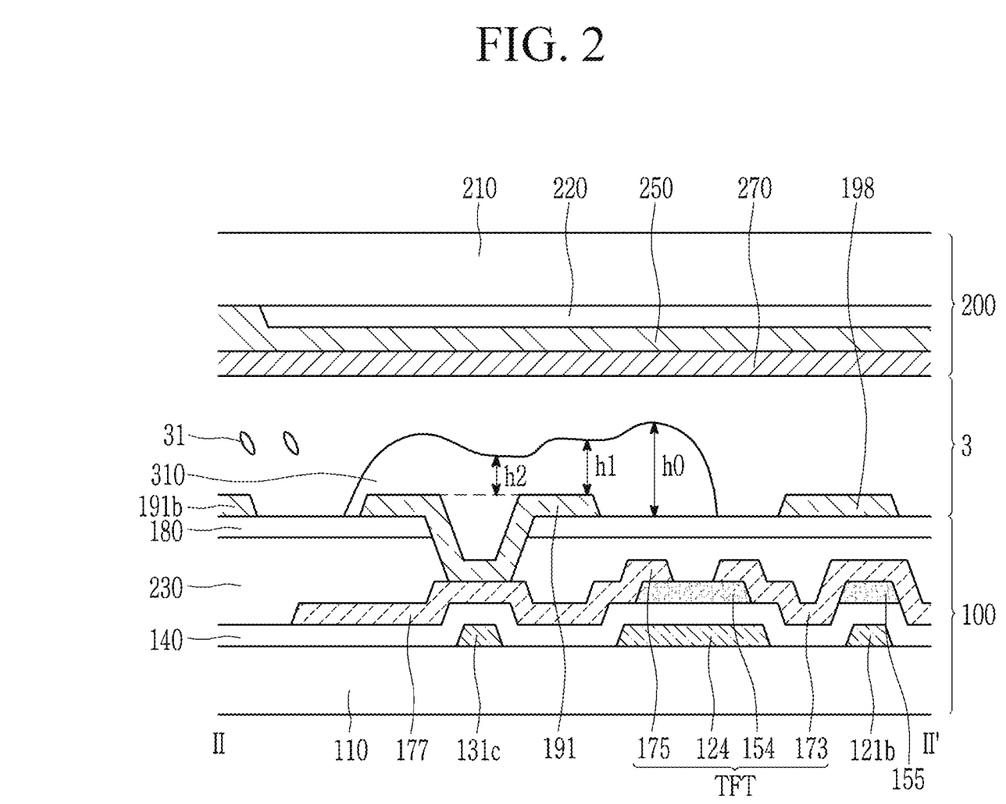
FIG. 2 illustrates a cross-sectional view taken along line II-II' of FIG. 1.
Figure 3:
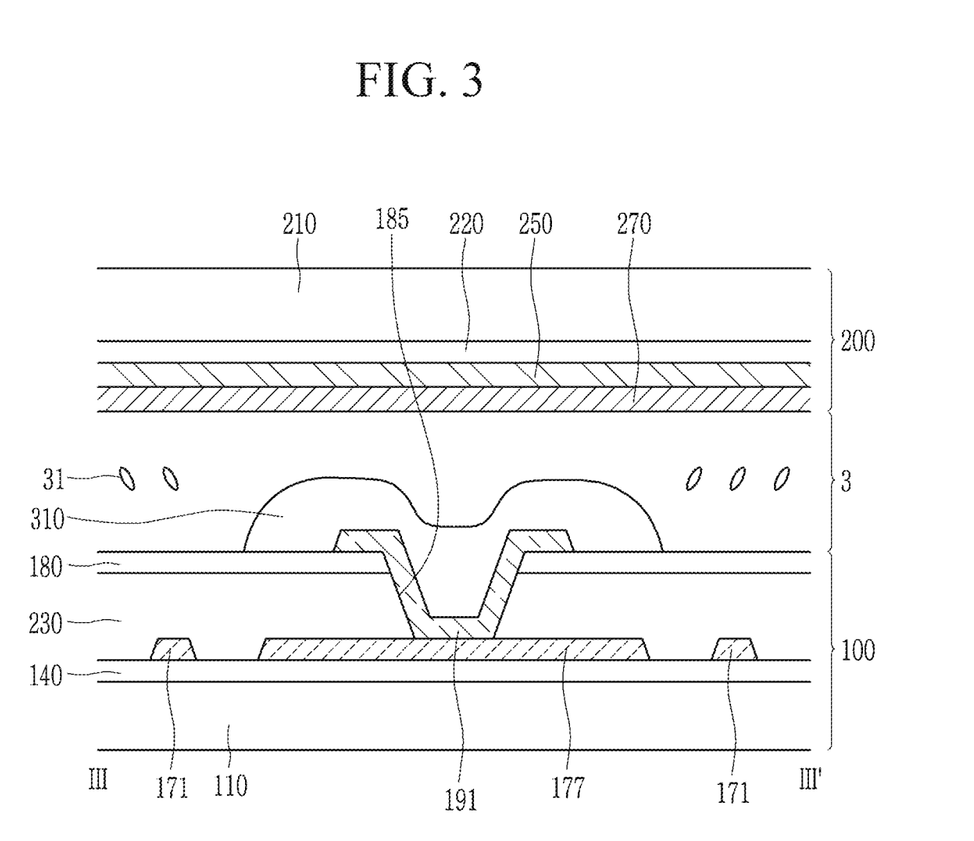
FIG. 3 illustrates a cross-sectional view taken along line III-III' of FIG. 1.

FIG. 1 illustrates a layout view of one pixel of a display device according to an embodiment, FIG. 2 illustrates a cross-sectional view taken along line II-II' of FIG. 1, and FIG. 3 illustrates a cross-sectional view taken along line III-III' of FIG. 1.

Referring to FIG. 1 to FIG. 3, the display device according to the embodiment includes a first display panel 100 and a second display panel 200 facing each other, and a liquid crystal layer 3 disposed therebetween.

First, the first display panel 100 will be described.

The first display panel 100 includes a first substrate 110 and a gate conductor stacked thereon, a semiconductor layer 154, a data conductor, a color filter 230, a pixel electrode 191, and a first spacer 310.

A gate conductor is disposed on the first substrate 110 which is formed of transparent glass or plastic. The gate conductor may include a gate line 121 and a storage electrode line 131.

The gate line 121 extends in a first direction DR1 and transmits a gate signal. The gate line 121 includes a pair of sub-gate lines 121a and 121b disposed parallel to each other, and a gate electrode 124.

The pair of sub-gate lines 121a and 121b extend parallel to each other in the first direction DR1. A gate electrode 124 is disposed between the pair of sub-gate lines 121a and 121b, and the gate electrode 124 may be disposed and connected between the pair of sub-gate lines 121a and 121b. The pair of sub-gate lines 121a and 121b may transmit the same gate signal.

As such, when one gate line 121 is divided and formed into the pair of sub-gate lines 121a and 121b, even if one sub-gate line 121a is damaged due to a short-circuit or the like, the other sub-gate line 121b may transmit a gate signal, which may be advantageous when the display device is repaired.

The storage electrode line 131 extends in the first direction DR1 parallel to the gate line 121 and transmits a predetermined voltage such as a common voltage. The storage electrode line 131 is spaced apart from the gate electrode 124 and the gate line 121 in a plan view. The storage electrode line 131 includes a first storage electrode line 131a extending in the first direction DR1, a second storage electrode line 131b extending in a second direction DR2 from the first storage electrode line 131a, and a protrusion 131c partially protruding from the first storage electrode line 131a in the second direction DR2 toward the pixel electrode 191.

The gate conductor may include a metal such as copper (Cu), molybdenum (Mo), aluminum (Al), silver (Ag), chromium (Cr), or tantalum (Ta,) or a metal alloy thereof, and it may be formed as a single layer or a multilayer.

A gate insulating film 140 is disposed on the gate conductor. The gate insulating film 140 may cover the first substrate 110 and the gate conductor. The gate insulating film 140 may include an inorganic insulating material such as a silicon oxide or a silicon nitride.

The semiconductor layer 154 and an overlapping semiconductor layer 155 are disposed on the gate insulating film 140. The semiconductor layer 154 and the overlapping semiconductor layer 155 may include a semiconductor material such as an oxide semiconductor, amorphous silicon, or polycrystalline silicon. The semiconductor layer 154 forms an active layer of a transistor TFT which will be described later. A plurality of overlapping semiconductor layers 155 are disposed in a region in which the gate line 121 and a data line 171 cross or a region in which the storage electrode line 131 and the data line 171 cross so that they may prevent an electrical short between a gate conductive layer and a data conductive layer.

An ohmic contact layer (not shown) may be disposed on the semiconductor layer 154. When the semiconductor layer 154 includes silicon, the ohmic contact (not shown) may include an n+ hydrogenated amorphous silicon in which n-type impurities such as phosphorus (P) are heavily doped at a high concentration, or a silicide.

A data conductor including the data line 171, a source electrode 173, and a drain electrode 175 is disposed on the semiconductor layer 154, the overlapping semiconductor layer 155, and the gate insulating film 140.

The data line 171 extends in the second direction DR2 perpendicular to the first direction DR1 and transmits a data voltage. The data line 171 is disposed to cross the gate line 121. The data line 171 may be configured as two data lines 171 that are disposed at respective sides of one pixel PX and overlap the one pixel PX.

The source electrode 173 may extend from the data line 171 and overlap the gate electrode 124, and it may substantially have a U-shape.

The drain electrode 175 is separated from the data line 171 and is separated from the source electrode 173. The drain electrode 175 extends toward a central portion of the U-shaped source electrode 173 and includes an extension 177 electrically connected to the pixel electrode 191 which will be described later. The extension 177 of the drain electrode 175 may overlap the storage electrode line 131. Particularly, the drain electrode 175 may overlap the protrusion 131c of the storage electrode line 131. The extension 177 of the drain electrode 175 overlaps the protrusion 131c of the storage electrode line 131 to form a storage capacitor Cst. Even when a data voltage is not applied to the data line 171, the storage capacitor Cst may maintain voltages applied to the drain electrode 175 and the pixel electrode 191 connected to the drain electrode 175.

The data conductor may include a metal such as aluminum (Al), copper (Cu), silver (Ag), gold (Au), platinum (Pt), palladium (Pd), nickel (Ni), molybdenum (Mo), tungsten (W), titanium (Ti), chromium (Cr), tantalum (Ta), or the like, or a metal alloy thereof, and it may be formed of a single layer or a multilayer.

One gate electrode 124, one source electrode 173, and one drain electrode 175 form one transistor TFT together with the semiconductor layer 154. A channel of the transistor TFT may be formed in the semiconductor layer 154 between the source electrode 173 and the drain electrode 175.

A color filter 230 is disposed on the data conductor. The color filter 230 may include a red color filter, a green color filter, and a blue color filter. Each color filter 230 may be disposed one by one in regions defined by the gate lines 121 and the data lines 171.

An insulating film 180 including an inorganic insulating material such as a silicon oxide and a silicon nitride, and an organic insulating material, is disposed on the color filter 230. The insulating film 180 may be an organic film, and planarizes an upper surface of the color filter 230. In addition, the insulating film 180 may prevent contaminants in the color filter 230 from being diffused into the liquid crystal layer 3. In some embodiments, the insulating film 180 may be omitted.

The insulating film 180 and the color filter 230 include an opening 185 exposing the extension 177 of the drain electrode 175. The extension 177 of the drain electrode 175 may be physically and electrically connected to the pixel electrode 191 through the opening 185. Accordingly, a data voltage may be applied to the pixel electrode 191 from the drain electrode 175.

The pixel electrode 191 and a shielding electrode 198 are disposed on the insulating film 180. The pixel electrode 191 and the shielding electrode 198 may include a transparent conductor such as an ITO or an IZO, or a metal such as aluminum, silver, chromium, or an alloy thereof.

The pixel electrode 191 includes a cross-shaped stem portion including a horizontal stem portion 191a extending in the first direction DR1 and a vertical stem portion 191b extending in the second direction DR2, a fine branch portion 191c extending in a diagonal direction from the cross-shaped stem portion, a connecting portion 191d connected to the extension 177 of the drain electrode 175, a horizontal bar portion 191e extending from the connecting portion 191d, and an outer portion 191f surrounding an edge of the pixel electrode 191

A shape of the pixel electrode 191 will be described in detail with reference to FIG. 4 to FIG. 6 described later.

The shielding electrode 198 extends along the first direction DR1 and is spaced apart from the pixel electrode 191. Specifically, it is spaced apart from the horizontal bar portion 191e of the pixel electrode 191 and the outer portion 191f of the pixel electrode 191. The shielding electrode 198 may be disposed to overlap a portion of the gate line 121. In addition, the shielding electrode 198 may be disposed to overlap one end of the second storage electrode line 131b. The same voltage as that of a common electrode 270 described later may be applied to the shielding electrode 198. Accordingly, an electric field is not generated between the shielding electrode 198 and the common electrode 270, and liquid crystal molecules 31 disposed therebetween may not be affected by voltages applied to conductive layers and maintains the same orientation as it is initially arranged. The liquid crystal layer 3 between the shielding electrode 189 and the common electrode 270 maintains its orientation to display a black, and the liquid crystal molecule 31 itself may perform a function of a light blocking layer 220.

The first spacer 310 is disposed on the pixel electrode 191. In a plan view, the first spacer 310 includes a first overlapping portion 310a partially extended in the first direction DR1 and a second overlapping portion 310b partially extended from the first overlapping portion 310a in the second direction DR2. The first overlapping portion 310a and the second overlapping portion 310b may form a T-shape.

The first overlapping portion 310a overlaps with at least some of the protrusion 131c of the storage electrode line 131, the connecting portion 191d of the pixel electrode 191, the horizontal bar portion 191e of the pixel electrode 191, and the extension 177 of the drain electrode 175. In addition, the first overlapping portion 310a completely covers the opening 185 connecting the connecting portion 191d of the pixel electrode 191 and the extension 177 of the drain electrode 175. That is, the first spacer 310 may be disposed while filling a space recessed by the opening 185 of the color filter 230 and the insulating film 180. In addition, in a plan view, a side edge of the first overlapping portion 310a may overlap at least a portion of the data line 171.

The second overlapping portion 310b is disposed to overlap at least some of the gate line 121, the gate electrode 124, the semiconductor layer 154, the source electrode 173, the drain electrode 175, and the shielding electrode 198.

The first spacer 310 may extend to cover at least one edge portion of the connecting portion 191d of the pixel electrode 191 along a first direction. At least one edge of the connecting portion 191d of the pixel electrode 191 is disposed in a side edge of the first spacer 310. That is, the side edge of the connecting portion 191d of the pixel electrode 191 is disposed within a side edge of the first overlapping portion 310a of the first spacer 310. The first spacer 310 is disposed to cover at least one edge of the connecting portion 191d of the pixel electrode 191 along a first direction so that, in a region near the opening 185 of the color filter 230 and the insulating film 180, it is possible to prevent misalignment of the liquid crystal due to an uneven surface. The first spacer 310 may extend to cover both edge portions of the connecting portion 191d of the pixel electrode 191 along a first direction.

A height h0 of the first spacer 310 at a portion overlapping the drain electrode 175 may be higher than a height h1 of the first spacer 310 at a portion overlapping the pixel electrode 191 and the extension 177 of the drain electrode 175. The height h1 of the first spacer 310 at a portion overlapping the extension 177 of the drain electrode 175 may be higher than a height h2 of the first spacer 310 from an upper surface of the pixel electrode 191 at the opening 185 through which the extension 177 of the drain electrode 175 and the pixel electrode contacts.

A display device according to a comparative example does not include the first spacer 310. Accordingly, in the comparative example, the liquid crystal molecules 31 may be disposed to be inclined in a direction of the opening 185 due to a step of the opening 185 in which the pixel electrode 191 and the drain electrode 175 are connected. As the direction of the liquid crystal molecules 31 in the region spaced apart from the opening 185 and the direction of the liquid crystal molecules 31 near the opening 185 are not uniform, a bruising phenomenon may occur in the display device.

However, in the display device according to the embodiment, as the first spacer 310 is disposed on the pixel electrode 191, misalignment of the liquid crystal due to a step caused by the opening 185 may be prevented. That is, by improving texture control power of the liquid crystal, it is possible to ameliorate the bruising phenomenon to the display device.

Hereinafter, the second display panel 200 will be described. The second display panel 200 may include a second substrate 210 facing the first substrate 110, a light blocking layer 220 stacked on the second substrate 210, an overcoat 250, and a common electrode 270. The overcoat 250 may be omitted according to embodiments, and an alignment film may be disposed on the common electrode 270.

The light blocking layer 220 is disposed on the second substrate 210 which is formed of transparent glass or plastic. The light blocking layer 220 has an opening 185 in a region overlapping the pixel electrode 191 of the first display panel 100. The light blocking layer 220 is disposed to overlap the data line 171, the gate line 121, the transistor TFT, and the like, and is disposed so as not to overlap most of the pixel electrode 191. To be disposed on the second substrate 210 means that a layer is disposed on the same direction as the light blocking layer 220 with respect to the second substrate 210. When looking at a stacked order from an outside direction of the second display panel 200, it may be considered that the light blocking layer 220 is disposed under the second substrate 210.

The common electrode 270 is disposed on the second substrate to cover all the pixels PX to receive a common voltage.

The liquid crystal layer 3 includes a plurality of liquid crystal molecules 31. The liquid crystal molecules 31 has negative dielectric anisotropy, and the liquid crystal molecules 31 of the liquid crystal layer 3 may be aligned so that long axes thereof are perpendicular to surfaces of the first and second display panels 100 and 200 in a state in which there is no electric field. The pixel electrode 191 to which a data voltage is applied generates an electric field together with the common electrode 270 of the second display panel 200 to determine the direction of the liquid crystal molecules 31 of the liquid crystal layer 3 between the two electrodes 191 and 270. Luminance of light passing through the liquid crystal layer 3 may vary according to the direction of the liquid crystal molecules 31 determined as described above.

Hereinafter, the pixel electrode 191, the first spacer 310, and the like will be described in detail with reference to FIG. 4 to FIG. 6.

Figure 4:
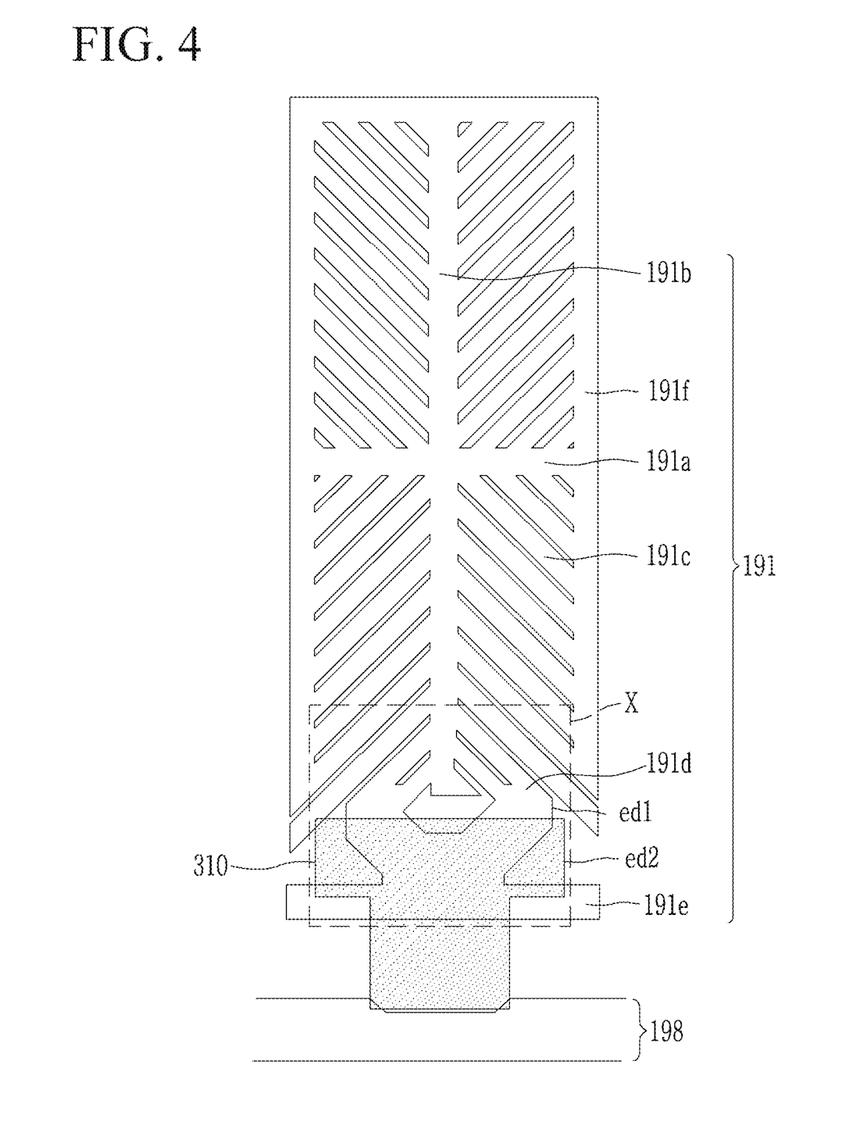
FIG. 4 illustrates a pixel electrode, a shielding electrode, and a spacer in the display device of FIG. 1.

FIG. 4 illustrates a pixel electrode, a shielding electrode, and a first spacer in the display device of FIG. 1. FIG. 5 illustrates an enlarged view of a portion of the pixel electrode of FIG. 4, and FIG. 6 illustrates an enlarged view of a portion of the pixel electrode of FIG. 4. Here, a portion may mean an 'X' area of FIG. 4.

Figure 5:
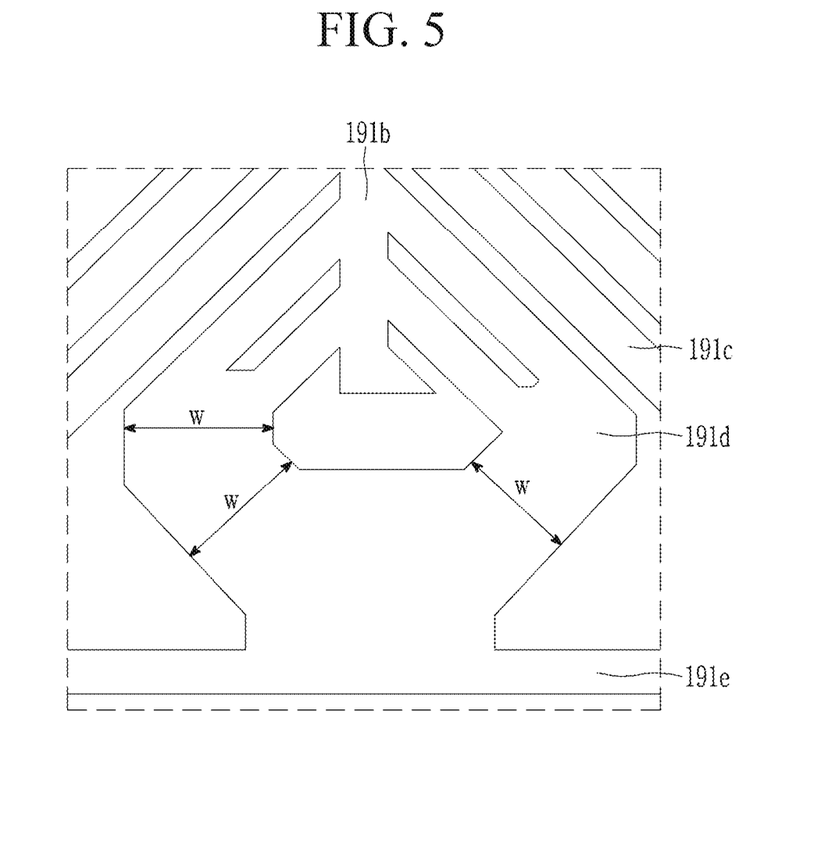
FIG. 5 illustrates an enlarged view of a portion of the pixel electrode of FIG. 4.
Figure 6:
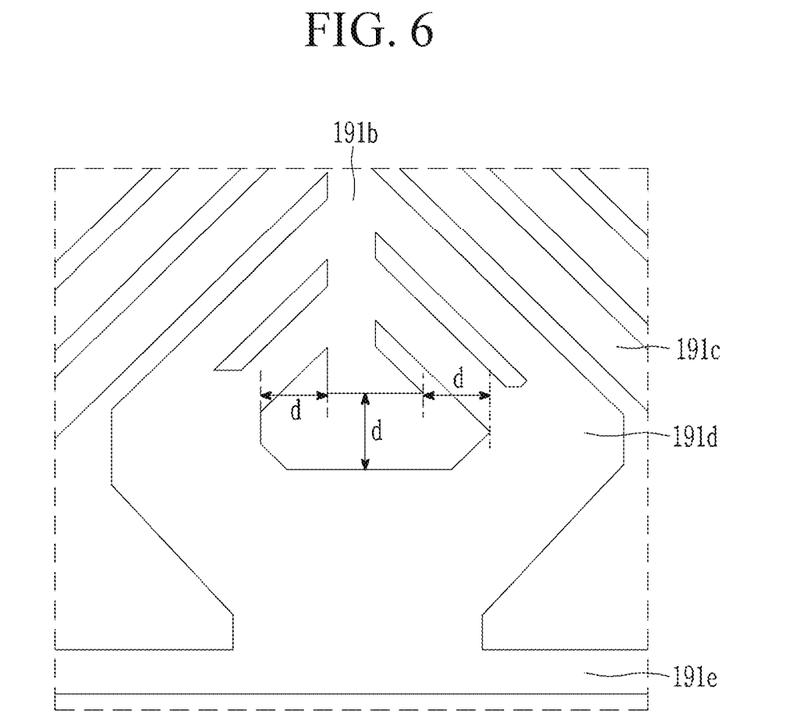
FIG. 6 illustrates an enlarged view of a portion of the pixel electrode of FIG. 4.

Referring to FIG. 4 to FIG. 6, the pixel electrode 191 includes a cross-shaped stem portion including a horizontal stem portion 191a extending in the first direction DR1 and a vertical stem portion 191b extending in the second direction DR2, a fine branch portion 191c extending in a diagonal direction from the cross-shaped stem portion, a connecting portion 191d connected to the extension 177 of the drain electrode 175, a horizontal bar portion 191e extending from the connecting portion 191d, and an outer portion 191f surrounding an edge of the pixel electrode 191.

Most of the fine branch portion 191c may be connected to the outer portion 191f. A portion of the fine branch portion 191c may not be connected to the outer portion 191f. The connecting portion 191d of the pixel electrode 191 may be connected to the fine branch portion 191c extending from the vertical stem portion 191b. In addition, the connecting portion 191d of the pixel electrode 191 may extend from the fine branch portion 191c. The connecting portion 191d and the plurality of fine branch portions 191c connected to the connecting portion 191d may have a rhombus shape including an opening.

The horizontal bar portion 191e may extend in the first direction DR1 and an edge of the horizontal bar portion 191e may coincide with that of the outer portion 191f.

The first spacer 310 is disposed to overlap at least a portion of the connecting portion 191d and the horizontal bar portion 191e of the pixel electrode 191. In addition, the first spacer 310 may be disposed to overlap at least a portion of the shielding electrode 198.

A side edge ed1 of the connecting portion 191d of the pixel electrode 191 is disposed inside of a side edge ed2 of the first spacer 310 in a first direction D1. That is, the connecting portion 191d of the pixel electrode 191 is disposed within the first spacer 310 in the first direction D1 and the first spacer 310 is disposed to cover at least one edge of the connecting portion 191d of the pixel electrode 191 so that, in a region near the opening 185 of the color filter 230 and the insulating film 180, it is possible to prevent misalignment of the liquid crystal due to a step. The first spacer 310 is disposed to cover both edges of the connecting portion 191d of the pixel electrode 191 in the first direction D1.

Referring to FIG. 5, the connecting portion 191d of the pixel electrode 191 may have a width w of 10 μm or more. When the connecting portion 191d has the width w of 10 μm or more, the widths w of the connecting portion 191d extending from the fine branch 191c at the left of the vertical stem portion 191b and the connecting portion 191d extending from the fine branch 191c at the right thereof may be the same or different. Therefore, a crack of the pixel electrode 191 may be prevented in the display device according to the embodiment.

Referring to FIG. 6, the connecting portion 191d of the pixel electrode 191 is spaced apart from the vertical stem portion 191b. In the second direction DR2, a distance d from one end of the vertical stem portion 191b to the connecting portion 191d may be 7 μm or more. In addition, in the first direction DR1, a distance d from a side end of the vertical stem portion 191b to the connecting portion 191d may be 7μm or more. In the embodiment, the distance d between the vertical stem portion 191b and the connecting portion 191d is maintained at a minimum of 7 μm, thereby stably controlling the alignment of the liquid crystal. Therefore, the display device according to the embodiment may ameliorate the bruising phenomenon and improve display quality.

Hereinafter, a display device including a plurality of pixels will be described with reference to FIG. 7 and FIG. 8.

Figure 7:
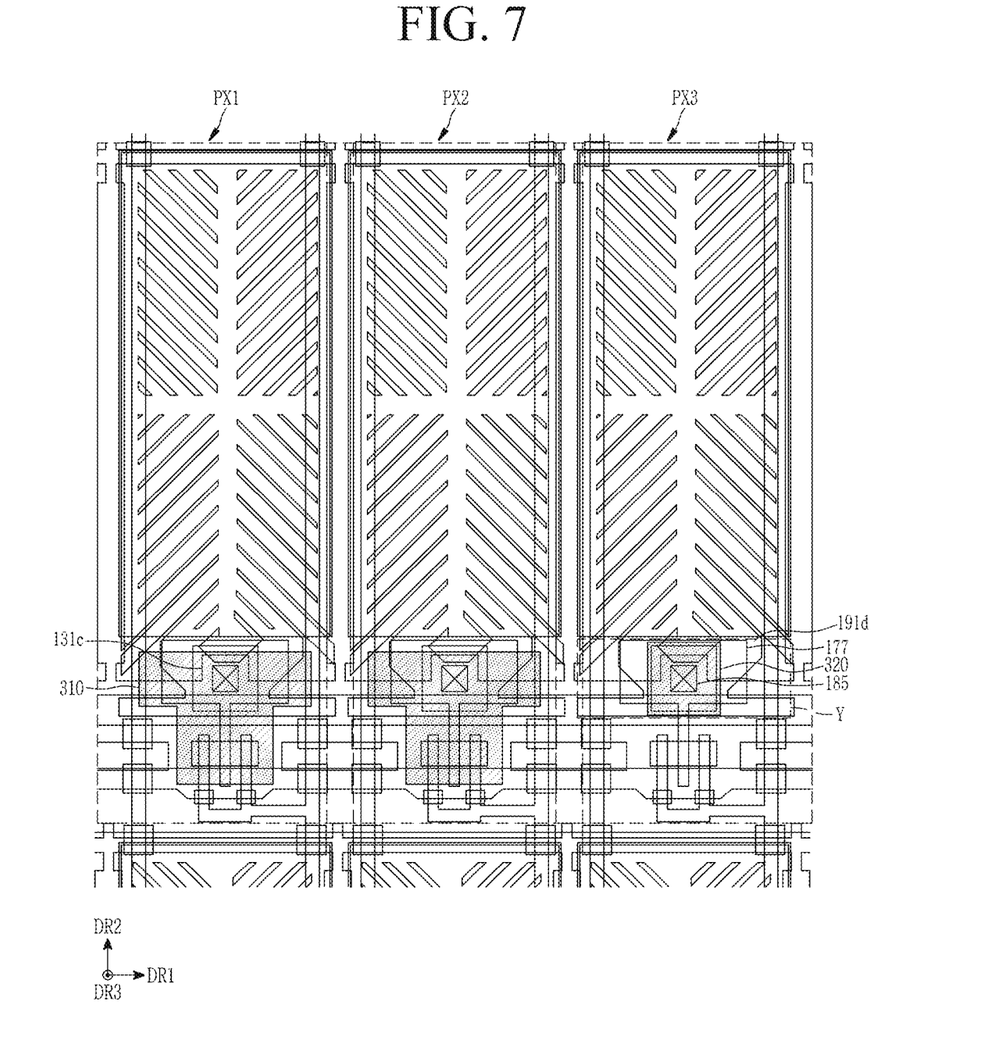
FIG. 7 illustrates a layout view of a plurality of pixels of a display device according to an embodiment.
Figure 8:
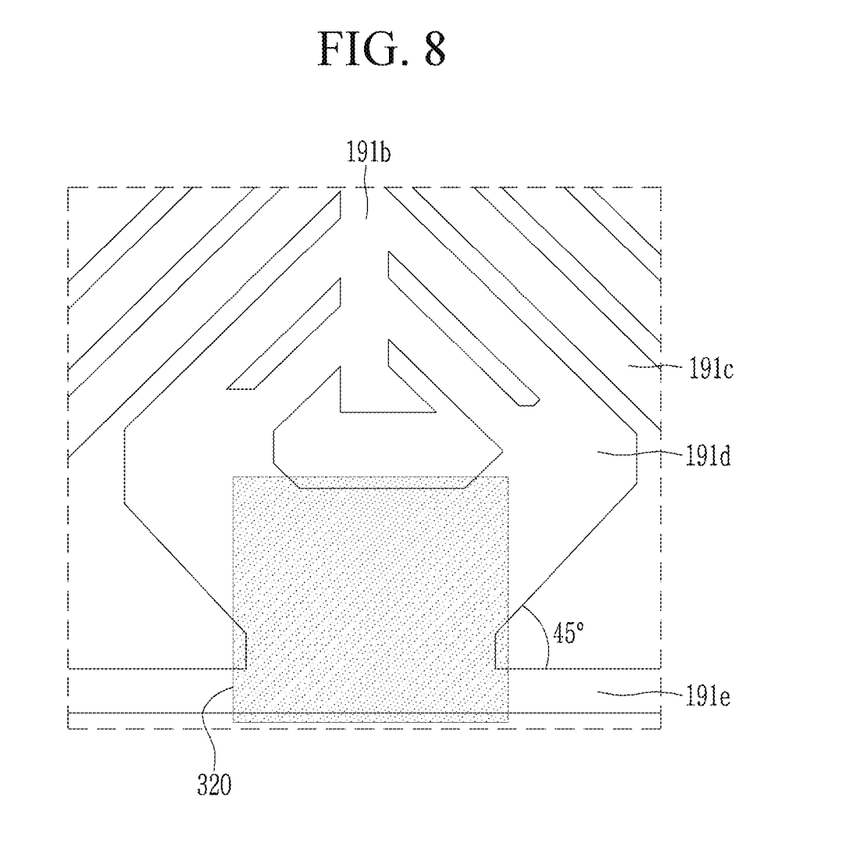
FIG. 8 illustrates an enlarged view of a portion of a pixel electrode in the display device of FIG. 7.

FIG. 7 illustrates a layout view of a plurality of pixels of a display device according to an embodiment, and FIG. 8 illustrates an enlarged view of a portion of a pixel electrode in the display device of FIG. 7. Here, a portion may mean a 'Y' portion of FIG. 7.

Referring to FIG. 7, the display device according to the embodiment includes a first pixel PX1, a second pixel PX2, and a third pixel PX3 that are adjacent to each other in the first direction DR1. Each of the pixels PX1, PX2, and PX3 includes a gate line 121, a data line 171 crossing the gate line 121, a transistor TFT connected to the gate line 121 and the data line 171, and a first spacer 310 and a second spacer 320. Here, the first pixel PX1 may be a pixel displaying red or green, the second pixel PX2 may be a pixel displaying red or green that the first pixel does not display, and the third pixel PX3 may be a pixel displaying blue.

The first pixel PX1 and the second pixel PX2 illustrated in FIG. 7 may correspond to one pixel of the display device described with reference to FIG. 1 to FIG. 6. Since the third pixel PX3 is mostly the same as the first pixel PX1 and the second pixel PX2, hereinafter, a difference between the first and second pixels and the third pixel will be mainly described.

The second spacer 320 is disposed on the pixel electrode 191. In a plan view, the second spacer 320 may have a square shape in which lengths of horizontal and vertical sides are the same. A planar area of the second spacer 320 may be smaller than that of the first spacer 310. In some embodiments, the second spacer 320 may have a rectangular shape in which lengths of horizontal sides and vertical sides are different, and may be realized to have various shapes such as a circle or a polygon.

The second spacer 320 overlaps at least a portion of the storage electrode line 131, the pixel electrode 191, and the drain electrode 175. In addition, the second spacer 320 overlaps the opening 185 connecting the connecting portion 191d of the pixel electrode 191 and the extension 177 of the drain electrode 175. That is, the second spacer 320 may be disposed while filling a space recessed by the opening 185 of the color filter 230 and the insulating film 180 in a plan view.

Referring to FIG. 8, the second spacer 320 is disposed to overlap at least a portion of the connecting portion 191d and the horizontal bar portion 191e of the pixel electrode 191. An angle between an edge of the connecting portion 191d of the pixel electrode 191 and an edge of the horizontal bar portion 191e adjacent thereto may be 45°.

A thickness of a third color filter 230 included in the third pixel PX3 may be greater than those of the first and second color filters 230 and 230 included in the first and second pixels PX1 and PX2. When the second spacer 320 includes an overlapping portion that is wider than the first spacer 310, a height of the second spacer 320 may be excessively high, thus misalignment of the liquid crystal may increase. In contrast, in the display device according to the embodiment, the third pixel PX3 includes the second spacer 320 having a smaller overlapping portion than those in the first and second pixels PX1 and PX2, thereby improving the control power of the liquid crystal arrangement.

Hereinafter, an effect of improving control of liquid crystal arrangement of a display device according to an embodiment will be described with reference to FIG. 9.

Figure 9:
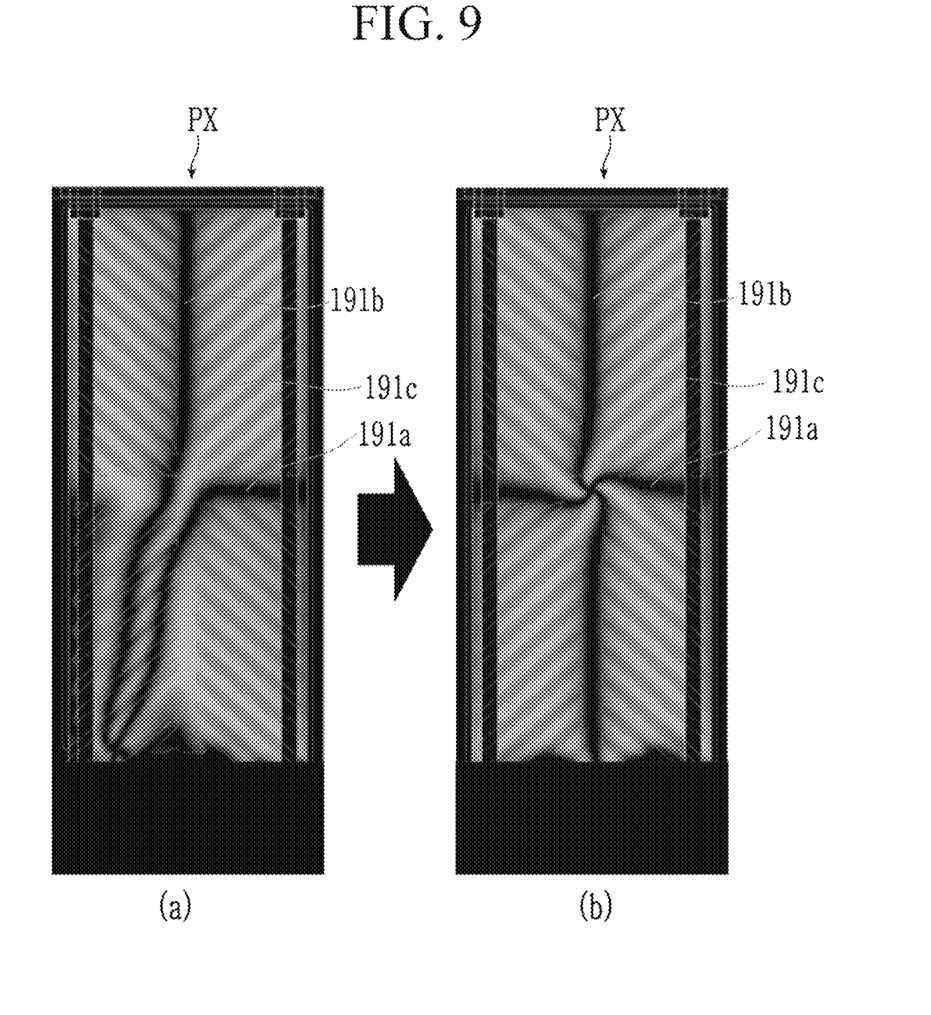
FIG. 9 illustrates an image of a texture simulation result of one pixel of a display device according to a comparative example and a display device according to an embodiment.

FIG. 9 illustrates an image of a texture simulation result of one pixel of a display device according to a comparative example and a display device according to an embodiment.

Referring to FIG. 9, one pixel PX according to the embodiment may include a cross-shaped stem portion including the horizontal stem portion 191a and the vertical stem portion 191b, and the fine branch portion 191c extending outward from the cross-shaped stem portion. One pixel PX illustrated in FIG. 9 may be one of the first pixel PX1, the second pixel PX2, and the third pixel PX3 described above.

FIG. 9 (a) illustrated at the left is a view showing a texture simulation result when one pixel PX does not include a spacer. The spacer may be the first spacer 310 or the second spacer 320 described above.

In the pixel PX shown in FIG. 9 (a), a defect occurs in the liquid crystal arrangement due to a step due to the opening 185 in which the pixel electrode 191 and the drain electrode 175 are connected so that a dark portion is formed in a region of the fine stem portion 191c of the pixel electrode 191. Since the dark portion may be formed in a region of the opening in which the fine stem portion 191c is disposed, a texture defect in which a bruising phenomenon is viewed may occur.

FIG. 9 (b) illustrated at the right is a view showing a texture simulation result when one pixel PX includes a spacer. The spacer may be the first spacer 310 or the second spacer 320.

In the pixel PX of FIG. 9 (b), a step due to the opening is eliminated by the spacer to prevent misalignment of the liquid crystal, so that a dark portion is formed only in the cross-shaped stem portion of the pixel electrode 191. Since the dark portion is formed only in the cross-shaped stem portion, it can be confirmed that a bruising phenomenon in the fine stem portion 191c may be prevented and thus an image is normally displayed.

While this disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A display device comprising:
    a first substrate;
    a gate line disposed on the first substrate and extending in a first direction;
    a storage electrode line extending in the first direction on the same layer as the gate line and including a protrusion partially protruding in a second direction perpendicular to the first direction;
    a data line insulated from the gate line and the storage electrode line and extending in the second direction;
    a drain electrode disposed on the same layer as the data line and including an extension portion overlapping the protrusion;
    a pixel electrode including a connecting portion electrically connected to the extension portion of the drain electrode; and
    a first spacer disposed on the pixel electrode and partially overlapping the protrusion of the storage electrode line,
    wherein the first spacer covers an edge of the connecting portion of the pixel electrode in the first direction.

2. The display device of claim 1, wherein the first spacer includes a first overlapping portion overlapping an opening through which the connecting portion of the pixel electrode and the extension of the drain electrode are connected and a second overlapping portion overlapping at least a portion of the drain electrode and the gate line.

3. The display device of claim 2, wherein the first spacer has a T-shape in a plan view.

4. The display device of claim 3, wherein the edge of the connecting portion of the pixel electrode is covered by the first overlapping portion.

5. The display device of claim 2, further comprising a color filter disposed between the drain electrode and the pixel electrode, and an insulating film disposed on the color filter.

6. The display device of claim 5, wherein the color filter and the insulating film include the opening.

7. The display device of claim 1, wherein the pixel electrode further includes:
    a cross-shaped stem portion including a horizontal stem portion extending in the first direction and a vertical stem portion extending in the second direction,
    a fine branch portion extending in a diagonal direction from the cross-shaped stem portion, and
    a horizontal bar portion extending from the connecting portion.

8. The display device of claim 7, wherein a width of the connecting portion is 10 μm or more.

9. The display device of claim 7, wherein a distance from one end of the vertical stem portion to the connecting portion is 7 μm or more.

10. The display device of claim 7, wherein the connecting portion and the fine branch portion connected to the connecting portion include an opening having a rhombus shape.

11. A display device comprising:
    a plurality of pixels displaying different colors,
    wherein the plurality of pixels include:
    a gate line disposed on a first substrate and extending in a first direction;
    a storage electrode line extending in the first direction on the same layer as the gate line and including a protrusion partially protruding in a second direction perpendicular to the first direction;
    a data line insulated from the gate line and the storage electrode line and extending in the second direction;
    a drain electrode disposed on the same layer as the data line and including an extension portion overlapping the protrusion;
    a pixel electrode including a connecting portion electrically connected to the extension portion of the drain electrode; and
    a first spacer disposed on the pixel electrode and partially overlapping the protrusion of the storage electrode line, and
    wherein, in at least one of the plurality of pixels, the first spacer covers an edge of the connecting portion of the pixel electrode in the first direction.

12. The display device of claim 11, wherein the plurality of pixels include a first pixel displaying red, a second pixel displaying green, and a third pixel displaying blue.

13. The display device of claim 12, wherein the third pixel includes a second spacer having a smaller area than that of the first spacer.

14. The display device of claim 13, wherein the first spacer and the second spacer overlap an opening through which the connecting portion of the pixel electrode and the extension of the drain electrode are connected.

15. The display device of claim 14, wherein the first spacer includes a first overlapping portion overlapping the opening connecting the connecting portion of the pixel electrode and the extension of the drain electrode, and a second overlapping portion overlapping at least a portion of the drain electrode and the gate line.

16. The display device of claim 15, wherein the first spacer has a T-shape.

17. The display device of claim 14, wherein the second spacer has a square shape.

18. The display device of claim 12, wherein the first pixel includes a first color filter, the second pixel includes a second color filter, and the third pixel includes a third color filter, and a thickness of the third color filter is greater than those of the first color filter and the second color filter.

19. The display device of claim 11, wherein the pixel electrode further includes:
    a cross-shaped stem portion including a horizontal stem portion extending in the first direction and a vertical stem portion extending in the second direction,
    a fine branch portion extending in a diagonal direction from the cross-shaped stem portion, and
    a horizontal bar portion extending from the connecting portion.

20. The display device of claim 19, wherein an angle between an edge of the connecting portion and an edge of the horizontal bar portion adjacent to the edge of the connecting portion is 45°.

* * * * *